United States Patent
Stegmeier et al.

(10) Patent No.: US 10,988,102 B2
(45) Date of Patent: Apr. 27, 2021

(54) FRONT AIRBAG FOR VEHICLE OCCUPANTS

(71) Applicant: TRW Automotive GmbH, Alfdorf (DE)

(72) Inventors: Michael Stegmeier, Schwäbisch Gmünd (DE); Axel Kamrath, Aschaffenburg (DE)

(73) Assignee: TRW AUTOMOTIVE GMBH, Alfdodrf (DE)

(*) Notice: Subject to any disclaimer, the term of this patent is extended or adjusted under 35 U.S.C. 154(b) by 10 days.

(21) Appl. No.: 16/340,722

(22) PCT Filed: Oct. 5, 2017

(86) PCT No.: PCT/EP2017/075361
§ 371 (c)(1),
(2) Date: Apr. 10, 2019

(87) PCT Pub. No.: WO2018/069149
PCT Pub. Date: Apr. 19, 2018

(65) Prior Publication Data
US 2019/0308582 A1    Oct. 10, 2019

(30) Foreign Application Priority Data
Oct. 13, 2016  (DE) ...................... 10 2016 119 568.5

(51) Int. Cl.
*B60R 21/233* (2006.01)
*B60R 21/231* (2011.01)
(Continued)

(52) U.S. Cl.
CPC .......... *B60R 21/233* (2013.01); *B60R 21/231* (2013.01); *B60R 21/235* (2013.01);
(Continued)

(58) Field of Classification Search
CPC .......................... B60R 21/233; B60R 21/231
(Continued)

(56) References Cited

U.S. PATENT DOCUMENTS 3,752,501 A * 8/1973 Daniel .................. B60R 21/261
                                                280/729
3,843,150 A * 10/1974 Harada .................. B60R 21/231
                                                280/729
(Continued)

FOREIGN PATENT DOCUMENTS

| FR | 2876334 | 4/2006 |
| JP | 02283545 | 11/1990 |
| JP | 03136946 | 6/1991 |

*Primary Examiner* — Faye M Fleming
(74) *Attorney, Agent, or Firm* — Tarolli, Sundheim, Covell & Tummino LLP

(57) ABSTRACT

A front airbag for vehicle occupants, comprising a front face (16) facing the vehicle occupant in the inflated state, a rear panel (14) facing the vehicle front end and a chamber defining the interior of the inflated airbag (10) is characterized in that, relating to the front face (16), a central sub-chamber starting from the front face (16) is provided which is defined by a central front panel (20) forming part of the front face (16) and a circumferential central side panel (22), wherein the circumferential side panel (22) protrudes into the envelope of the inflated airbag (10), and in that at least one outer chamber (30) laterally adjacent to the central sub-chamber (18) and surrounding the sub-chamber (18) at least partially on the outside is provided which includes an outer front panel (32) forming part of the front face (16) and a side panel (34) which is adjacent to the central side panel (22).

25 Claims, 9 Drawing Sheets

(51) Int. Cl.
*B60R 21/235* (2006.01)
*B60R 21/00* (2006.01)

(52) U.S. Cl.
CPC ............... *B60R 2021/0009* (2013.01); *B60R 2021/0048* (2013.01); *B60R 2021/23509* (2013.01)

(58) Field of Classification Search
USPC ........................................................ 280/729
See application file for complete search history.

(56) References Cited

U.S. PATENT DOCUMENTS

| | | | |
|---|---|---|---|
| 5,253,892 A | 10/1993 | Satoh | |
| 5,393,092 A | 2/1995 | Charns et al. | |
| 5,934,701 A | 8/1999 | Furukawa | |
| 6,086,092 A | 7/2000 | Hill | |
| 6,155,595 A * | 12/2000 | Schultz | B60R 21/233 280/729 |
| 6,419,262 B1 | 7/2002 | Fendt et al. | |
| 6,962,363 B2 * | 11/2005 | Wang | B60R 21/233 280/729 |
| 7,377,548 B2 * | 5/2008 | Bauer | B60R 21/231 280/743.2 |
| 9,272,684 B1 | 3/2016 | Keyser et al. | |
| 9,694,782 B2 * | 7/2017 | Nagatani | B60R 21/2338 |
| 9,925,948 B2 * | 3/2018 | Hotta | B60R 21/235 |
| 10,065,594 B2 * | 9/2018 | Fukawatase | B60R 21/2338 |
| 10,293,775 B2 * | 5/2019 | Wang | B60R 21/205 |
| 2004/0145162 A1 | 7/2004 | Abe et al. | |
| 2006/0197320 A1 | 9/2006 | Abe | |
| 2009/0206587 A1 | 8/2009 | Abe | |
| 2017/0088080 A1 | 3/2017 | Hotta et al. | |
| 2018/0354447 A1 * | 12/2018 | Nakajima | B60R 21/231 |
| 2019/0283702 A1 * | 9/2019 | Yamada | B60R 21/233 |
| 2020/0010044 A1 * | 1/2020 | Yamada | B60R 21/233 |
| 2020/0122677 A1 * | 4/2020 | Yamada | B60R 21/216 |

\* cited by examiner

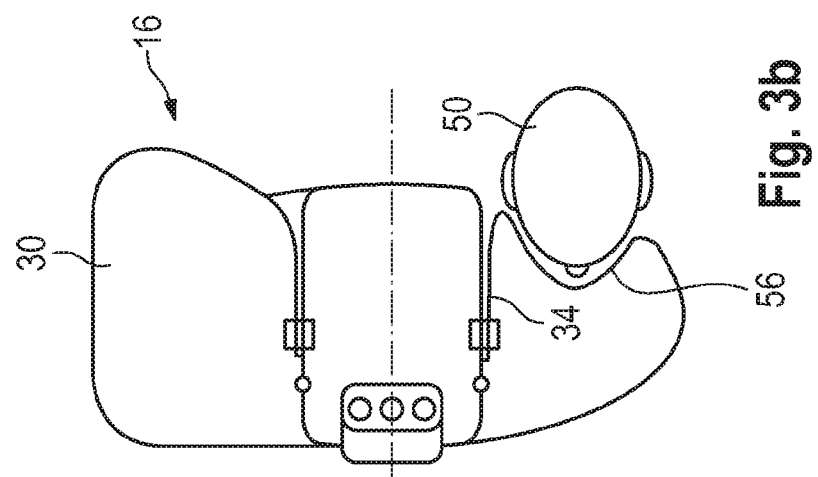
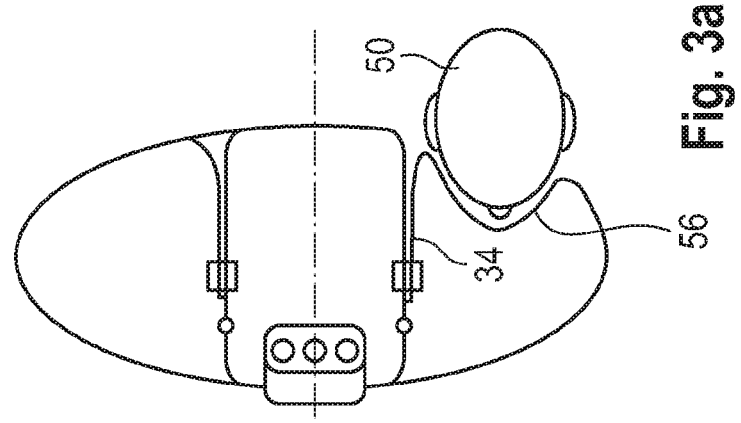

FRONT AIRBAG FOR VEHICLE OCCUPANTS

RELATED APPLICATIONS

This application corresponds to PCT/EP2017/075361, filed Oct. 5, 2017, which claims the benefit of German Application No. 10 2016 119 568.5, filed Oct. 13, 2016, the subject matter of which are incorporated herein by reference in their entirety.

BACKGROUND OF THE INVENTION

The invention relates to a front airbag for vehicle occupants, especially a driver airbag which offers protection in the case of frontal impact.

Front airbags, for example for driver or passenger, are accommodated in the steering wheel and, resp., in the instrument panel and in the case of restraint exit the same for extending in the direction of the occupant. The part of the airbag panel facing the vehicle occupant in the inflated state forms the front face of the airbag which is contacted by the occupant.

It is quite generally known to arrange tensile means, usually tethers, in airbags to impart a particular shape to the airbag, i.e. to prevent particular portions of the airbag panel from moving unhindered during deployment or during penetration by the occupant.

In the case of front airbags, it becomes increasingly important to control the movement of the head while the latter penetrates the airbag due to the friction between the head and the airbag panel, which is technically extremely difficult, however. It is especially difficult in the case of diagonal impact, when the head does not penetrate the airbag in the center but in the boundary area.

SUMMARY OF THE INVENTION

It is therefore the object of the invention to provide a front airbag that reduces or even excludes rotational movement of the head about the vertical axis. Especially, this is intended to be possible when the head contacts the boundary area of the airbag.

This object is achieved by a front airbag for vehicle occupants, comprising a front face in the inflated state facing the vehicle occupant, a rear panel facing the vehicle front end and a chamber defining the interior of the inflated airbag, characterized in that, relating to the front face, a central sub-chamber starting from the front face is provided which is defined by a central front panel forming part of the front face and a peripheral central side panel, wherein the peripheral side panel protrudes into the envelope of the inflated airbag, and in that at least one outer chamber laterally adjacent to the central sub-chamber and surrounding the sub-chamber at least partially on the outside is provided which includes an outer front panel forming part of the front face and a side panel which is adjacent to the central side panel.

The invention uncouples the outer area of the airbag mechanically at least partly from the central area formed by the central sub-chamber. This means that the forces acting on the occupant are reduced, because the side panels (central side panel and opposite side panel of the at least one outer chamber) impart additional "length" to the airbag panel by which the airbag allows the head to immerse more linearly in the area of the outer front panel. In previous airbags the inner edge of the contact area which is close to the center was prevented, by the positionally stable adjacent area of the front panel, from displacing/moving toward the rear panel when the head impacts so that a diagonal restraining force was exerted on the head and, resp., friction which resulted in rotation of the head was applied via the inclined surface.

In other words, when the occupant immerses into the boundary area of the airbag, more fabric material is made available which can move up when the occupant is immersing and when the front panel is displaced.

One embodiment of the invention provides that the side panel of the at least one outer chamber abuts at least in portions on the central side panel in the inflated state before it is contacted by the vehicle occupant. In this way, it is ensured that between the central sub-chamber and the at least one outer chamber no gap projecting deeply into the airbag (more exactly into the envelope) is provided. This refers, of course, to the completely inflated state of the airbag before immersion of the occupant.

The outer chamber may completely surround the periphery of the sub-chamber like a ring, i.e. only one outer chamber is provided.

Alternatively, plural outer chambers may jointly surround the complete periphery of the sub-chamber and may adjoin adjacent, especially abutting side panels in the circumferential direction. This means that the ring surrounding the central sub-chamber is composed of ring segments, each ring segment being defined by an outer chamber.

Said further subdivision of the airbag, in this case by subdividing the ring-shaped outer chamber into ring segments, results so-to-speak in smaller but partially independent sub-airbags so that so-to-speak independently acting zones are formed for the immersion of the head. The division of the sub-airbags is carried out, for example, by the fact that the airbag panel extends from the front face to the rear panel and in the vicinity thereof is fastened to the rear panel or to a part extending from the rear panel, thus forming an indentation between the sub-airbags formed in this way.

There may be provided a coupling means which extends on the outside over the central front panel without being fastened thereto and mechanically interconnects the portions of the outer front panel formed by the outer chambers, especially with the coupling means being star-shaped. Thus, the gap between the adjacent outer chambers and between the respective outer chamber and the central sub-chamber is reduced in a load case. The coupling means is of advantage especially in connection with the afore-described sub-airbags which are formed by the division of the outer chamber into ring segments. In this context, it is beneficial when the coupling means acts on each ring segment and is fastened thereto so as to hold the ring segments to each other in the area of the front face. Of course, the coupling means may be one single part or else different interacting parts. Different parts are straps, for example, for coupling opposite ring portions to each other and for mutually intersecting.

The central sub-chamber and the at least one outer chamber may be fluid-connected in the area close to the rear panel so that one inflator is sufficient. Moreover, this results in certain additional flexibility of the airbag when the occupant immerses into the same.

The functional division of the airbag according to the invention into individual zones or sub-areas is improved by the fact that the end of the central side panel opposed to the front face is connected to the rear panel directly or via at least one preferably flexible interconnected tensile element.

The end of the side panel of the at least one outer chamber which is located inside the envelope of the airbag may be connected to the rear panel directly or via the central side panel or via at least one, preferably flexible, interconnected tensile element.

In general, the tensile element may be in the form of a circumferential panel or a tether.

At least one joint tensile element may also be provided, however, namely for fastening the end of the central side panel and the end or ends of the side panel of the at least one outer chamber. Alternatively, one of the side panels may extend to the rear panel and may be fastened thereto. The other side panel is fastened to the first-mentioned side panel before the rear panel is reached. In this case, it suggests itself that, for example, the central side panel is the side panel which extends to the rear panel, and the side panel of the outer chamber or outer chambers is fastened to the side panel of the central sub-chamber.

Preferably, overflow openings should be provided in the side panel which extends to the rear panel.

The central side panel and the side panel of the at least one outer chamber located inside the envelope are connected, especially stitched, to each other in the peripheral direction. Said stitching may be carried out, for example, at a joint tether which then is fastened to the rear panel, or the shorter one of the two side panels is stitched, in the area of its end, to the longer side panel fastened to the rear panel.

Of course, also between adjacent tensile elements at least one overflow opening may be provided.

The central side wall extends very deeply into the interior of the envelope so as to provide as much fabric as possible which can be drawn up when the occupant presses into the outer chamber and deforms the latter. The central side panel extends over at least 50% of the maximum axial height of the airbag (measured from the rear panel to the front face), namely from the front face toward the rear panel. The central side panel extends from the front face over at least half the depth of the envelope of the airbag.

Especially, the central side panel extends over at least 60% of the maximum axial height of the airbag.

The central front panel and the at least one outer front panel are not connected to each other at the boundary side. This permits the outer front panel to be pressed inwardly independently of the central front panel when the occupant impacts on the outer front panel.

The central front panel and the at least one outer front panel in the inflated state of the airbag have a maximum distance of 50 mm at the boundary side. Said distance is formed especially by curvatures between the transition of the front panels to the associated side panels.

The at least one outer chamber adjacent to the central sub-chamber also is the chamber of the airbag which is located laterally most outside which means that no plurality of nested rings but only one ring is arranged around the central sub-chamber.

The central front panel and the at least one outer front panel are located on the envelope of the airbag. The envelope can be imagined in such way that theoretically a large elastic nylon stocking is pulled over the inflated airbag and is adjoins the outside of the airbag panel but does not deform the same.

Alternatively, or additionally, the central front panel can be farther distant from a radial plane through the rear panel than the at least one outer front panel.

The central front panel and the at least one outer front panel take an exclusively convex outward shape, especially having a radius of curvature of more than 200 mm, for example.

In order to hold the outer chambers more closely to each other and to the sub-chamber in the load case, the outer chambers are advantageously fastened to each other close to the sub-chamber via coupling means, preferably in the form of a tensile means.

The coupling means extend(s) beyond the front panel to a diametrically opposed portion of the front face of the respective outer chamber, where it is/they are fastened.

When more than two outer chambers and more than two coupling means are formed, the coupling means are advantageously interconnected in a node point above the central front panel.

The central side panel may be constituted by airbag material gathered in the circumferential direction, which provides for an especially functional variant which, in addition, can be easily materialized.

The central front panel and the central side panel preferably integrally merge into each other and, of preference, are made from fabric material.

The central front panel preferably projects from the at least one outer front panel in the inflated state.

BRIEF DESCRIPTION OF THE DRAWINGS

Further features and advantages of the invention can be inferred from the following description and from the following drawings which are referred to, and wherein:

FIG. 3b shows a top view onto the airbag according to FIG. 1 after the occupant has impacted on the airbag according to a variant of FIG. 3a, FIG. 4 shows a front view of the inflated airbag according to FIG. 1.

DESCRIPTION

Figure 1:
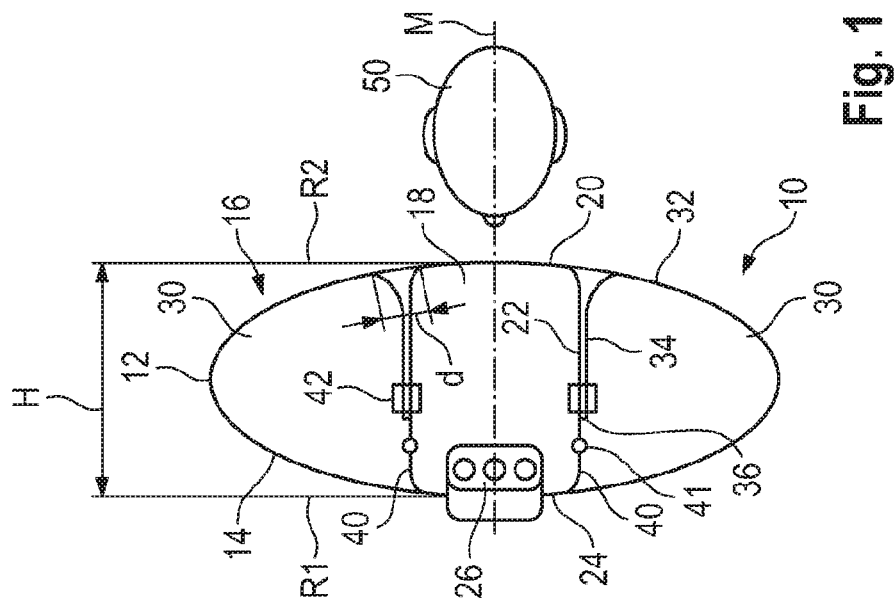
FIG. 1 shows a top view onto a cut fully inflated front airbag according to a first embodiment of the invention as well as an occupant before impact.

FIG. 1 illustrates a front airbag 10 in the form of a driver airbag shown from above.

The airbag has an outer panel 12 comprising plural portions, inter alia a rear panel 14 which is close to the windscreen. The front panel opposed to the rear panel 14 comprises plural parts which are partially acting independently of each other so that in this case in the first place a front face 16 is referred to.

Inside the airbag there is provided a large chamber which is divided into plural sub-chambers, however.

A sub-chamber 18 oriented centrally with respect to the central axis M of the airbag comprises a central front panel 20 which in portions forms the front face 16.

Said front panel 20 merges preferably integrally into a peripherally closed central side panel 22 which for example extends approximately cylindrically. The central side panel 22 is fastened (e.g. by stitching), preferably circumferentially fastened, with its end 24 to the rear panel 14, wherein also fastenings in portions would be imaginable. The reference numeral 26 represents an inflator projecting into the interior of the airbag 10 and being arranged centrally, for example, i.e. in the area of the sub-chamber 18. Overflow openings 41 in the central side panel 22 make sure that gas may flow into one or more outer chambers 30 extending around the central sub-chamber 13.

The single outer chamber 30 or the plural outer chambers 30 together form a ring which in closed form extends around the central sub-chamber 18 and also form the chamber or chambers of the airbag 10 located most laterally outside (relative to the central axis M).

The lateral outer chamber(s) 30 has/have an outer front panel 32 connected to the front panel and defining the front face 16 jointly with the central front panel 20.

The outer front panel 32 or each outer front panel, if there are more of them, equally merges integrally into an inner side panel 34 which closely to the central front panel 20 extends into the interior of the envelope of the airbag 10, namely directly along the central side panel 22, optionally while contacting the same, in order to be fastened at the end 36 to the side panel 22, namely at a distance from the rear panel 14. If there is only one outer chamber 30, the side panel 34 may be produced by inverting the fabric material in the area of the central sub-chamber 18.

The overflow opening 41 is preferably present in the area of the side panel 22 in which the latter is not covered by the side panel or side panels 34.

It is emphasized that in the Figures a minimal gap is shown between the side panels 22, 34 which need not occur in practice, however. Rather, the side panels 22, 34 can fully contact each other directly up to their transition to the associated front panels 20 and, resp., 32. The shown drawing including the space facilitates the discrimination of the side panels 22, 34, however.

Figure 2B:
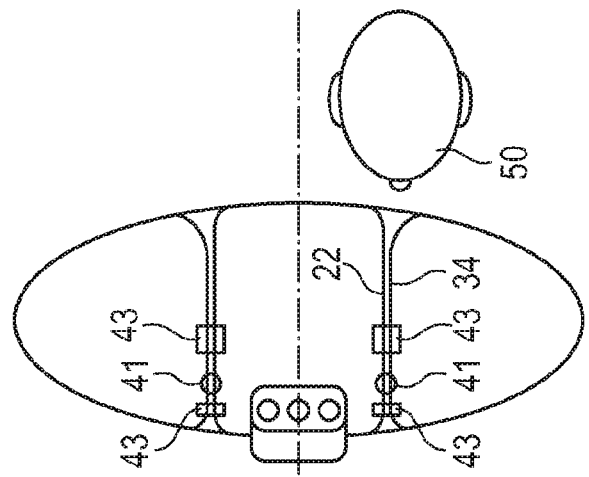
FIG. 2b shows a top view onto the airbag according to FIG. 1 after the occupant has impacted on the airbag according to a variant of FIG. 2a, FIG. 3a shows a top view onto the airbag according to FIG. 1 after the occupant has impacted on the airbag.
Figure 2A:
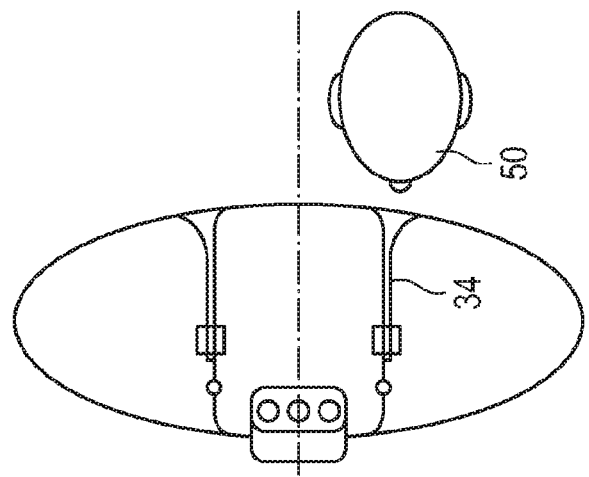
FIG. 2a shows a top view onto the airbag according to FIG. 1 after crash and shortly before the occupant impacts on the airbag.

The portion of the side panel 22 between the rear panel 14 and the end 36 may also be referred to as flexible tensile element 40 (see FIG. 2a). It is also imaginable that said flexible tensile element 40 is not formed by the shown portions of the side panel 22 but, inversely, by portions of the side panel 34 so that the side panel 22 can be designed to be shorter in the direction of the central axis M. Another alternative consists in the fact that the tensile element 40 is present as a 360° circumferential strap or that plural tethers extending in the direction of the central axis M and being spaced apart from each other in the circumferential direction are present which extend from the fastening point 42 of the two side panels 22, 34 to the wall 14 and bridge said part.

The respective portions or parts are preferably fastened by stitching.

As an alternative to FIG. 2a, FIG. 2b shows that both side panels 22, 34 extend to the rear panel 14 and are fastened to the same, e.g. by a closed annular seam. The side panels 22, 34 are fluid-connected to each other by aligned overflow openings 41 and are stitched to each other in the area of the overflow openings, see ring seams 43.

The fastening point 42 is located very deeply inside the envelope of the airbag 10 relative to the front face 16. The airbag has a maximum axial height H in the direction of the central axis M. Said height is measured in the present case by the distance of two radial planes R1 and R2 from the central axis M which abut on the points of the rear panel 14 and, resp., the front panel 20 most distant from each other. The radial plane R1 thus intersects or contacts the rear panel 14. The fastening point 42 is preferably located at a distance of at least 50% of the height H from the front face, here the radial plane R2, i.e. closer to the rear panel 14. Preferably, the fastening point 42 is distant from the front face 16 even by at least 60% of the height H. Accordingly, also the central side panel 22 has at least said length.

Whereas in the embodiment according to FIG. 3a the ring-shaped outer face 30 in the area of the front face 16 has a smaller thickness toward the outer circumference and extends convexly, the front face of the outer chamber 30 expands, in the embodiment according to FIG. 3b, in funnel shape toward the outer edge, i.e. at the front face 16 a funnel-shaped inwardly tapered shape is imparted to the entire airbag.

Figure 4:
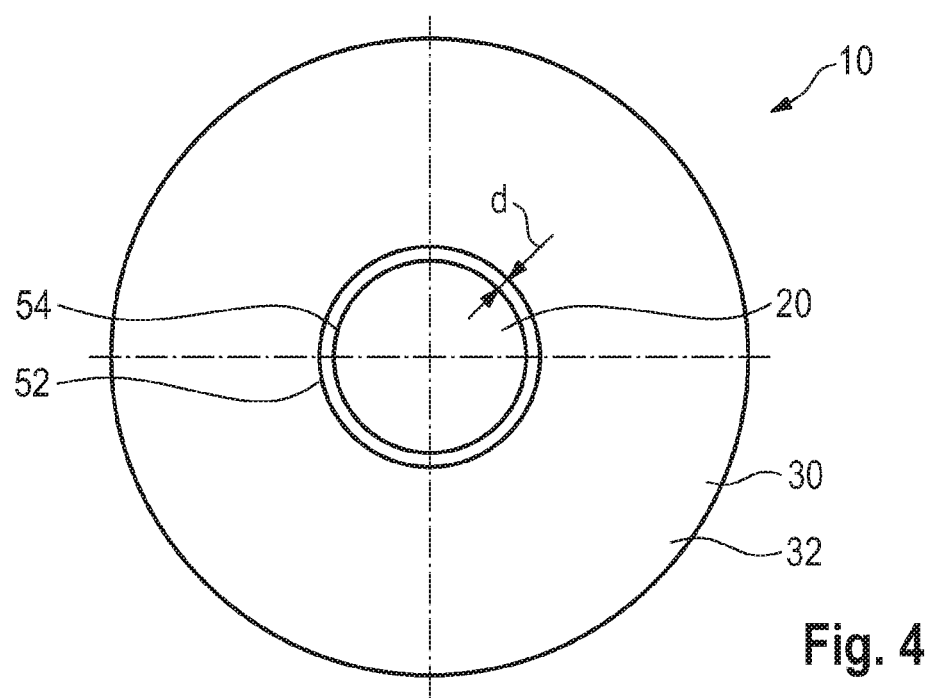

FIG. 4 illustrates a variant of the front airbag in which one single outer chamber 30 and thus a ring-shaped circumferential outer front panel 32 is provided. This means that the outer chamber 30 is a ring chamber. The maximum distance d of the outer front panel 32 from the central front panel 20 preferably amounts to a maximum of 50 mm, wherein it is emphasized that this is not limiting for the present invention. Said maximum distance d is formed in the area of the transition between the central front panel 20 and the outer front panel(s) 32 (cf. FIG. 1).

In the event of diagonal impact, the head 50 of the occupant moves out of the center so that the head does not immerse centrally into the front panel 20 but diagonally into the outer front panel 21, as is shown in FIG. 3.

Since the central front panel 20 is not connected to the at least one outer front panel 32 at the opposite edges 52, 54, upon immersion of the head 50 the side panel 34 can provide fabric so that the outer front panel 32 together with part of the adjacent side panel 34 permits a largely symmetric indentation 56 by the head 50. In other words, the side panel 34 moves up to help form portions of the indentation 56 so that the central sub-chamber 18 does not prevent the deformation of the panels forming the outer chamber 30 in terms of force. When being withheld, the head 50 is not rotated.

In the embodiment according to FIG. 5, the ring-shaped outer chamber shown in FIG. 4 is divided into two outer chambers 30 complementing each other to form the ring. The two resulting partial ring chambers extend over approx. 180° and abut against each other, namely by radial side panels 60, 62. Said side panels 60, 62 can extend, just as shown in FIG. 1, next to each other up to their connection and then can be coupled to the rear panel 14 equally via tensile elements 40.

In this case, too, appropriate overflow openings may be provided. As far as the position of the connecting point between said side panels 60, 62 is concerned, the same may be applicable as with respect to the fastening point 42 and its distance from the radial planes R1 and R2.

Figure 5A:
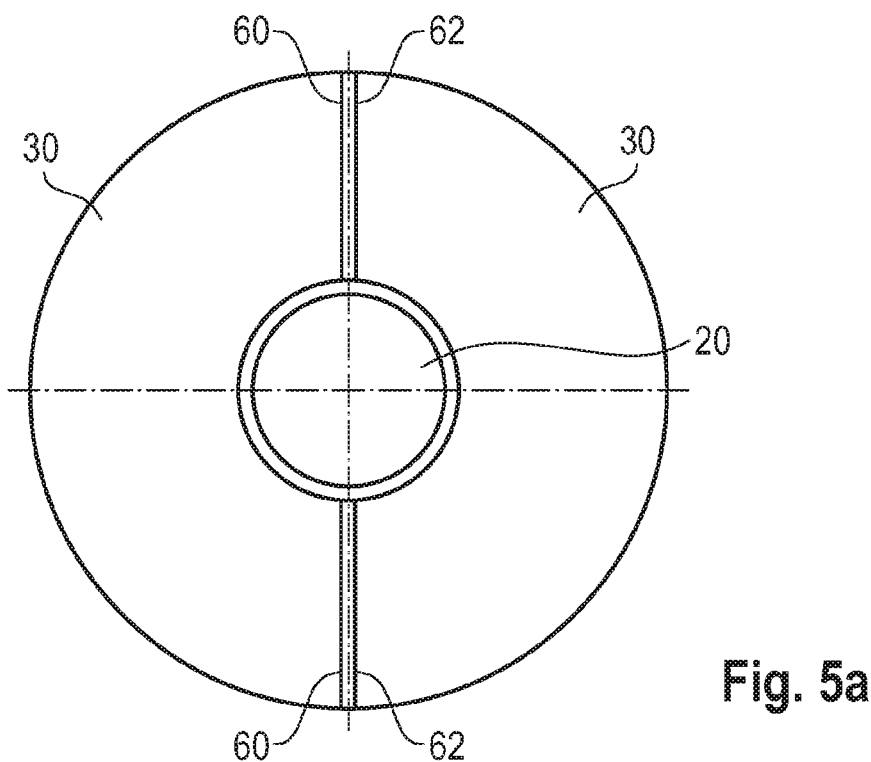
FIG. 5a shows a front view of the airbag according to a second configuration of the invention.
Figure 5B:
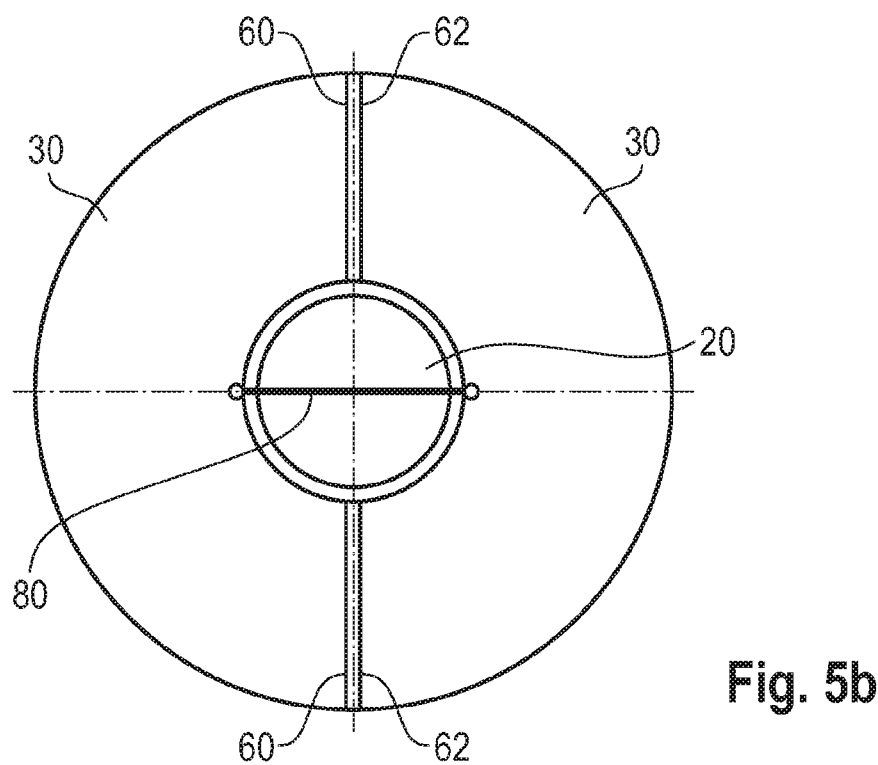
FIG. 5b shows a front view of the airbag according to a second configuration of the invention in accordance with a variant of FIG. 5a, FIG. 6 shows a front view of the airbag according to a third embodiment of the invention.
Figure 6:
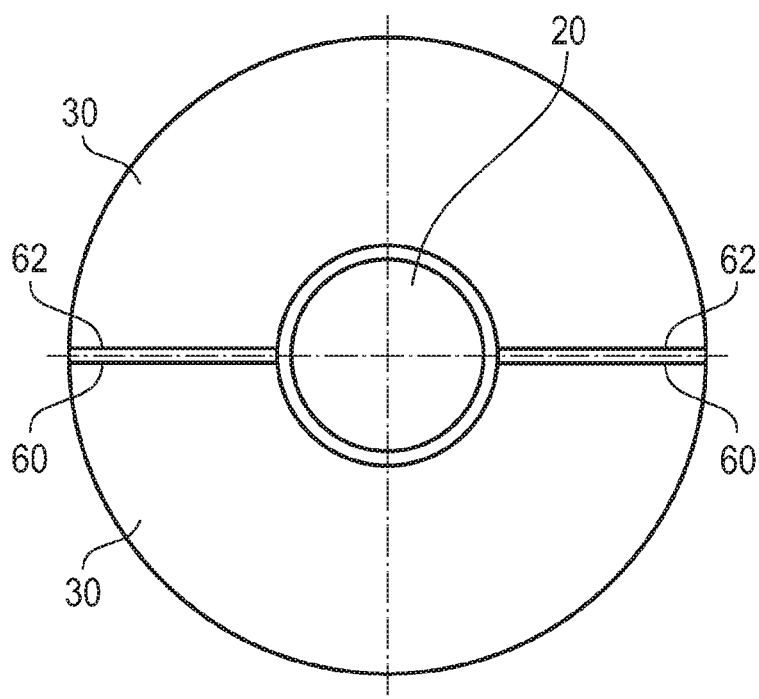

Whereas in the embodiment according to FIG. 5 the side panels 60, 62 extend vertically, in the embodiment according to FIG. 6 they extend horizontally. It is emphasized that any other position and orientation of the side panels 60, 62 is equally possible.

Figure 7:
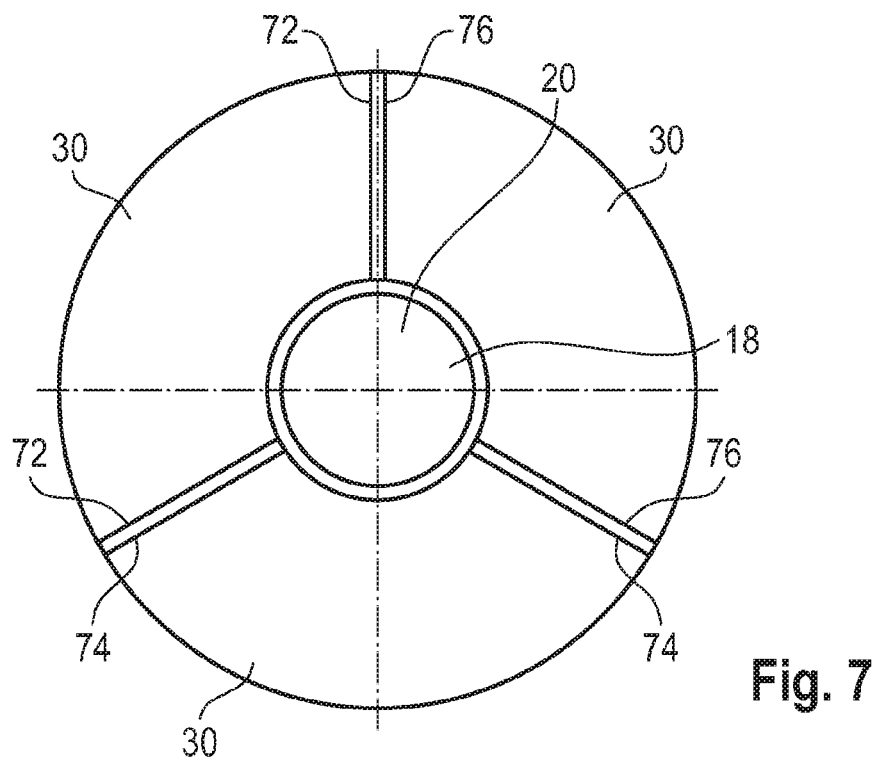
FIG. 7 shows a front view of the airbag according to a fourth embodiment of the invention.
Figure 8A:
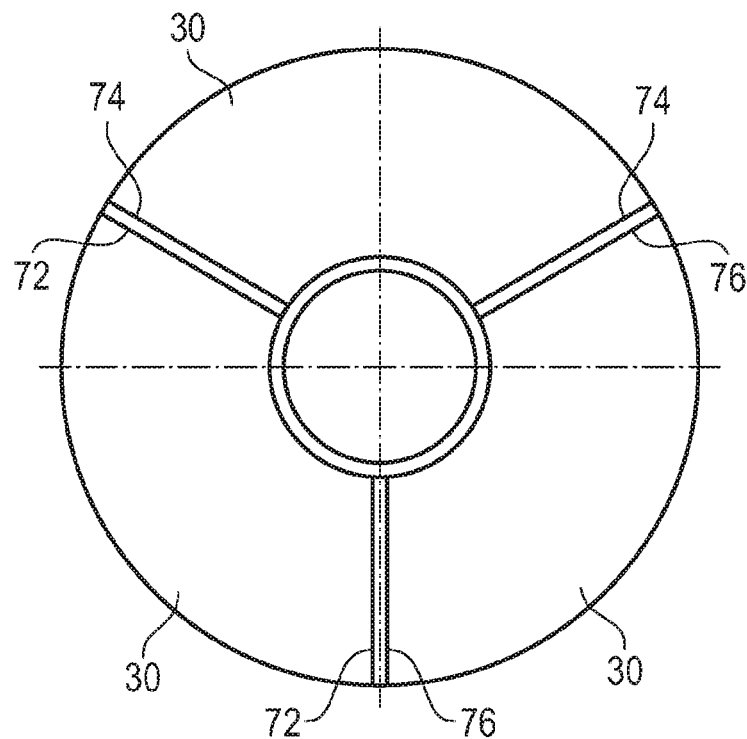
FIG. 8a shows a front view of the airbag according to a fifth embodiment of the invention.

In the embodiments according to FIGS. 7 and 8, there are three outer chambers 30 which complement each other to form a ring surrounding the central sub-chamber 18. The side panels 72, 74, 76 again are adjacent to each other, the foregoing applies mutatis mutandis with respect to theft extension.

FIGS. 7 and 8 only differ by the orientation of the outer chambers 30. Whereas in FIG. 7 one outer chamber 30 is located centrally in the lower half and the two upper ones are adjacent so that the meeting side panels 72, 76 extend vertically upwards from the sub-chamber 18, in the embodiment according to FIG. 8 this is exactly rotated by 180°.

Figure 9:
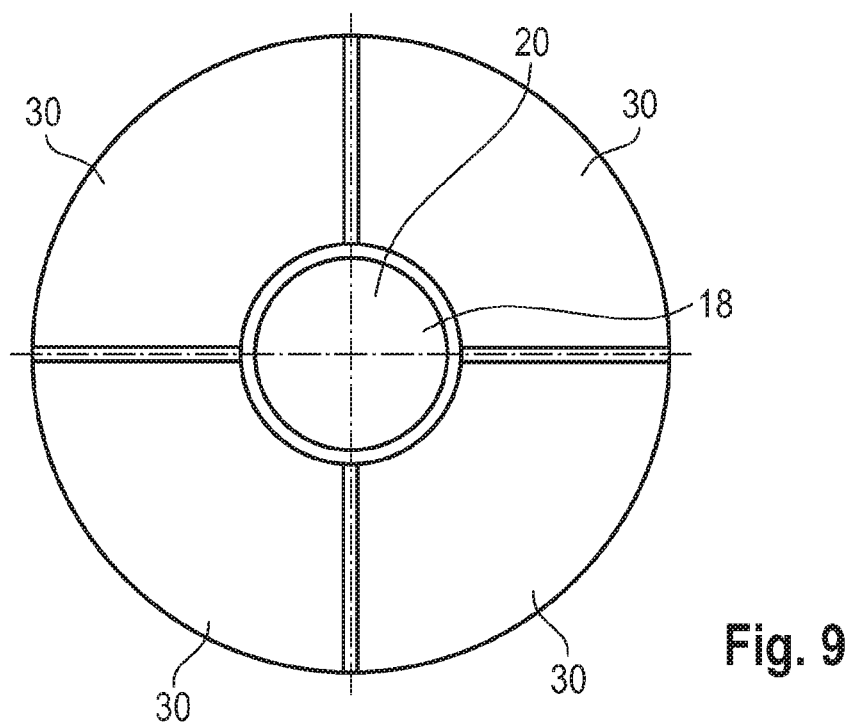
Figure 10A:
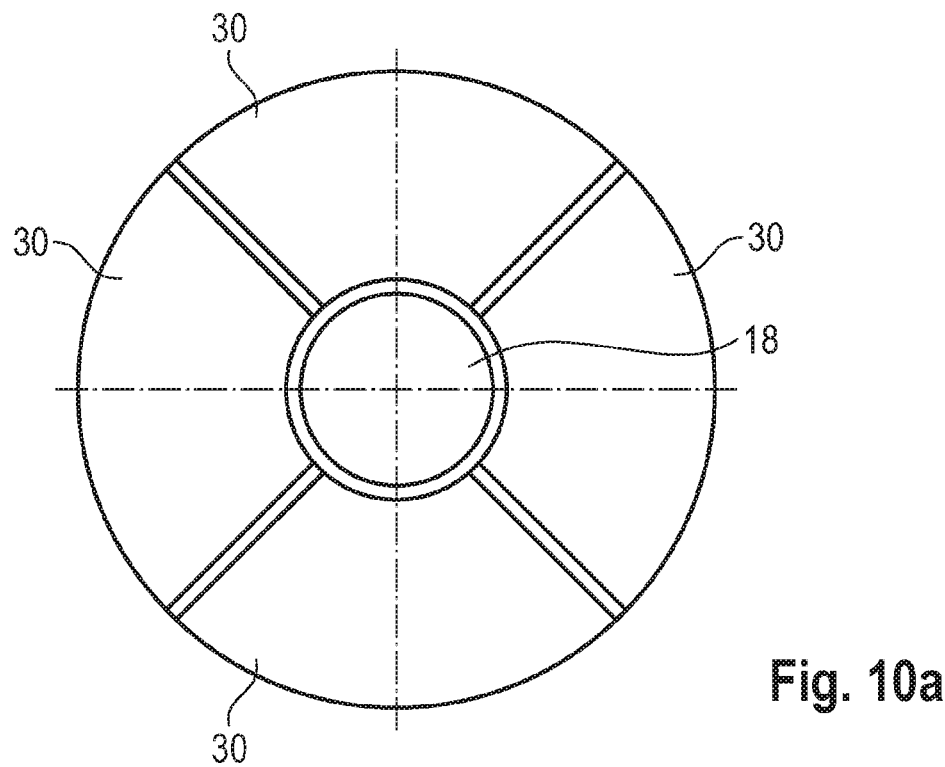
FIG. 10a shows a front view of the airbag according to a seventh embodiment of the invention.

In the embodiments according to FIGS. 9 and 10, even four outer chambers 30 are provided which complement each other to form a ring and surround the central sub-chamber 18. In this case, too, the embodiments only differ by the orientation of the outer chambers 30 with respect to the vertical and horizontal lines.

The circumferential length and/or the volume of the outer chambers 30 may be equal for each embodiment, if plural outer chambers are provided, so that in the embodiments according to FIGS. 5 to 10 symmetric outer chambers are formed. Of course, also outer chambers 30 which are individually located horizontally laterally, for example, may be smaller or larger than vertically located outer chambers 30.

As is evident from the Figures, the central front panel 20 protruding toward the occupant and the outer front panels 32 are located on the envelope of the airbag 10 and all of them are shaped exclusively convexly outwardly.

As an alternative to the shown embodiments, it is also imaginable, of course, that the side panels are in the form of separate pieces of fabric which then are stitched in the transition to their associated front panels 20, 32.

In order to hold the outer chambers 30 more closely to each other and to the sub-chamber 18 in the load case, FIG. 5b illustrates as a variant of FIG. 5a that the outer chambers 30 are fastened to each other close to the sub-chamber 18 via coupling means, in this case a tensile means 80. The coupling means extends beyond the front panel 20 to a diametrically opposed portion of the front face 16 of the respective outer chamber 30 where it is fastened. In this embodiment, the coupling means is not fastened to the front panel 20.

Figure 8B:
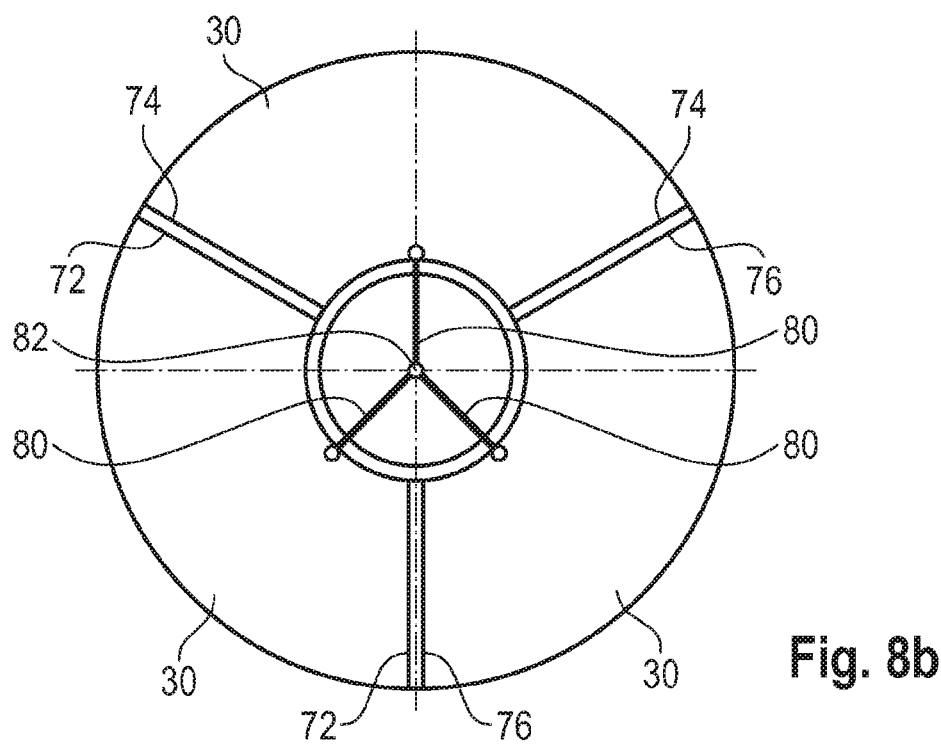
FIG. 8b shows a front view of the airbag according to a fifth embodiment of the invention in accordance with a variant of FIG. 8a, FIG. 9 shows a front view of the airbag according to a sixth embodiment of the invention.
Figure 10B:
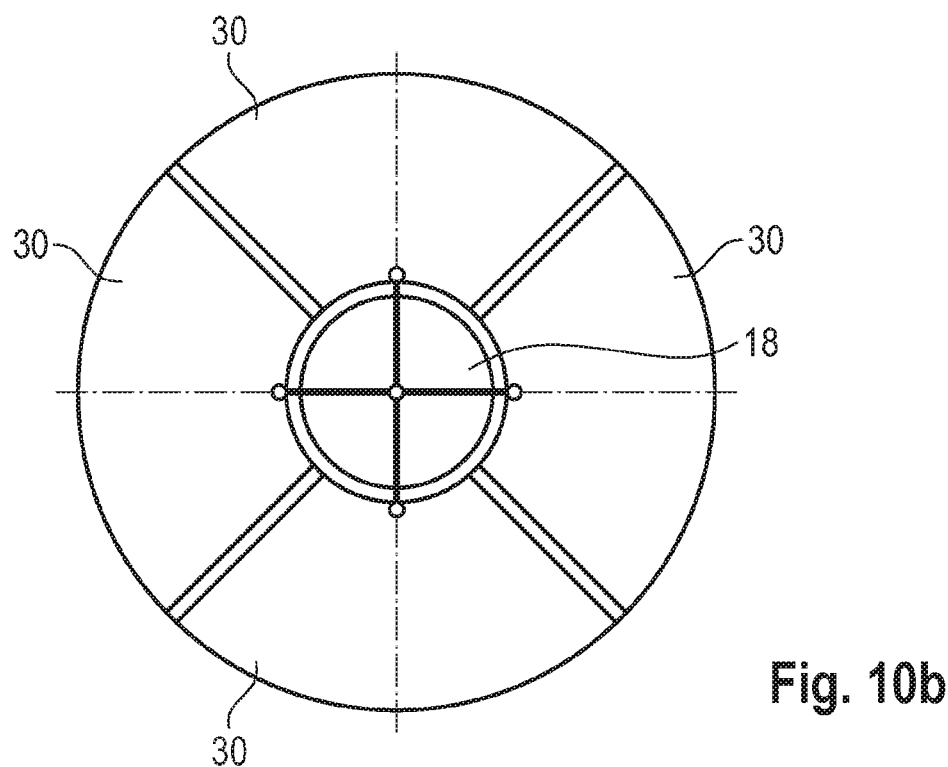
FIG. 10b shows a front view of the airbag according to a seventh embodiment of the invention in accordance with a variant of FIG. 10a, and FIG. 11 shows a front view of a variant of the embodiment according to FIG. 7.
Figure 11:
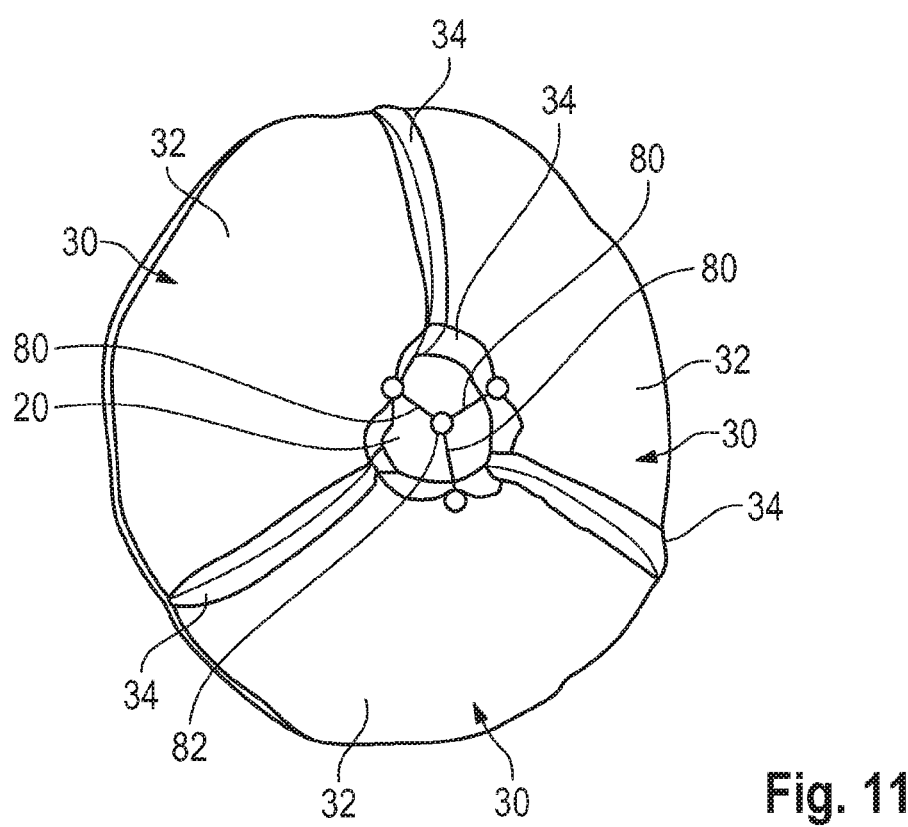

In the embodiments according to FIGS. 8b and 10b, the tensile means 80 extend in star shape toward each other. The tensile means 80 arranged in star shape are fastened to the outer chamber 30, more exactly to the portion of the outer front panel 32 defined by the respective outer chamber 30 or to the transition to the side panel 34.

The tensile means 80 extend from an outer end, related to the front view of the inflated airbag, via the central front panel 20 in order to be fastened, at their other end, either directly to another sub-chamber 18 or to a coupling member such as e.g. a ring or a node point via which the forces are coupled into other tensile means 80.

In the shown embodiment, the three tensile means 80 are connected to each other in a node point 82 above the central front panel. Of course, all of the tensile means 80 can merge integrally into one another by providing e.g. a star-shaped fabric part.

The coupling means is not fastened to the central front panel 20 in this case, either, but only extends over the same.

The coupling means may also be provided in the other embodiments having plural outer chambers 30, of course.

In general, the gap between the adjacent outer chambers 30 and between the respective outer chamber 30 and the central sub-chamber 18 is reduced in the load case. Also, the outer diameter of the airbag is reduced in the inflated state, while in turn the airbag depth is increased.

Despite the coupling of the outer chamber 30 and the central sub-chamber 18, an additional length is imparted to the airbag panel, for the fabric still can move up from outside in the case of load.

The invention claimed is:

1. A front airbag for vehicle occupants, comprising a front face (16) facing the vehicle occupant in the inflated state, a rear panel (14) facing the vehicle front end and a chamber defining the interior of the inflated airbag (10), wherein,
   relating to the front face (16), a central sub-chamber (18) starting from the front face (16) is provided which is defined by a central front panel (20) forming part of the front face (16) and an outward facing peripheral central side panel (22),
   wherein the central side panel (22) protrudes into the envelope of the inflated airbag (10), and
   in that at least one outer chamber (30) laterally adjacent to the central sub-chamber (18) and surrounding the sub-chamber (30) at least partially on the outside is provided which includes an outer front panel (32) forming part of the front face (16) and an inward facing inner side panel (34) which is separate from and adjacent to the central side panel (22), the inner side panel (34) and central side panel (22) facing one another in the inflated state.

2. The front airbag according to claim 1, wherein the side panel (34) of the outer chamber (30) is adjacent to the central side panel (22) at least in portions in the inflated state before it is contacted by the vehicle occupant.

3. The front airbag according to claim 1, wherein an outer chamber (30) completely surrounds the circumference of the sub-chamber (18).

4. The front airbag according to claim 1, wherein plural outer chambers (30) jointly surround completely the circumference of the sub-chamber (18) and in the circumferential direction are connected to adjacent side panels (22, 34).

5. The front airbag according to claim 4, wherein a coupling means is provided which extends on the outside over the central front panel (20) without being fastened to the latter and mechanically interconnects the portions of the outer front panel (32) formed by the outer chambers (30).

6. The front airbag according to claim 4, wherein the central sub-chamber (18) and the at least one outer chamber (30) are fluid-connected to each other in the area of the rear panel (14).

7. The front airbag according to claim 1, wherein the end (24) of the central side panel (22) opposed to the front face (16) is connected to the rear panel (14) directly or via at least one interconnected tensile element (40).

8. The front airbag according to claim 1, wherein the end (36) of the side panel (34) of the at least one outer chamber (30) which is located inside the envelope of the airbag is connected to the rear panel (14) directly or via the central side panel (22) or via at least one interconnected tensile element (40).

9. The front airbag according to claim 7, wherein at least one joint tensile element (40) is provided for fastening the end of the central side panel and the end or ends (36) of the side panel (34) of the at least one outer chamber (30) to the rear panel (14) or in that one of the side panels (22, 34) extends to the rear panel (14) and is fastened to the same and the other side panel (22, 34) is fastened, before reaching the rear panel (14), to the one side panel (22, 34), wherein the side panel (22, 34) which extends to the rear panel may include overflow openings (41).

10. The front airbag according to claim 7, wherein the central side panel (22) and the side panel (34) of the at least one outer chamber (30) located inside the envelope are connected to each other in the circumferential direction.

11. The front airbag according to claim 7, wherein between the central sub-chamber (18) and the at least one outer chamber (30) in the area of the at least one tensile element (40) at least one overflow opening (41) is provided.

12. The front airbag according to claim 7, wherein the central side panel (22) and the side panel (34) of the outer chamber (30) extend to the rear panel (14) and are fastened to the same, wherein the side panels (22, 34) are fluid-connected to each other by aligned overflow openings (41) and are stitched to each other in the area of the overflow openings.

13. The front airbag according to claim 1, wherein the central side panel (22) extends over at least 50% of the maximum axial height (H) of the airbag (10), which is measured from the rear panel (14) to the front face (16), from the front face (16) in the direction of the rear panel (14).

14. The front airbag according to claim 1, wherein the central front panel (20) and the at least one outer front panel (32) are not connected to each other at the boundary side.

15. The front airbag according to claim 14, wherein in the inflated state of the airbag (10) the central front panel (20) and the at least one outer front panel (32) have a distance (d) which amounts to a maximum of 50 mm.

16. The front airbag according to claim 14, wherein the at least one outer chamber (30) adjacent to the central sub-chamber (18) is the laterally outermost chamber of the airbag.

17. The front airbag according to claim 1, wherein the central front panel (20) and the at least one outer front panel (32) are located on the envelope of the airbag and/or in that the central front panel (20) is farther distant from a radial plane (R1) through the rear panel than the at least one outer front panel (32).

18. The front airbag according to claim 1, wherein the central side panel (22) is formed by airbag material gathered in the circumferential direction.

19. The front airbag according to claim 1, wherein the central front panel (20) and the central side panel (22) integrally merge into each other and are made from one fabric material.

20. The front airbag according to claim 19, wherein the outer chambers (30) are fastened to each other close to the central sub-chamber (18) via coupling means.

21. The front airbag according to claim 20, wherein the coupling means (80) is configured as a tensile element.

22. The front airbag according to claim 20, wherein plural coupling means (80) extend above the central front panel and are interconnected in a node point (82).

23. The front airbag according to claim 22, wherein the coupling means is star-shaped.

24. The front airbag according to claim 1, wherein an inflator (26) projects into the central sub-chamber (18) and is configured to deliver gas directly into the central sub-chamber (18) upon activation of the inflator (26).

25. The front airbag according to claim 1, wherein the central front panel (20) is uncoupled from the outer front panel (32) so that in the inflated state of the airbag (10), the central front panel (20) is spaced apart from the outer front panel (32) by a distance (d).

* * * * *